E. W. KNAPP.
TIRE RETAINING RIM FOR AUTOMOBILE WHEELS.
APPLICATION FILED DEC. 24, 1919.
1,390,043.
Patented Sept. 6, 1921.
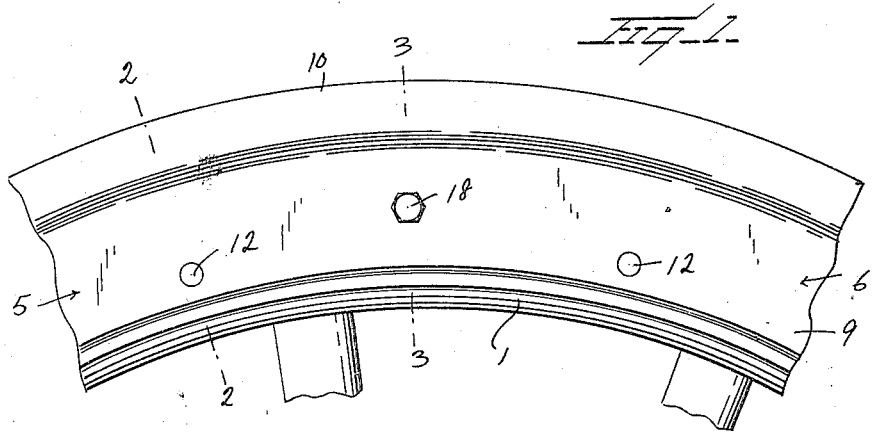
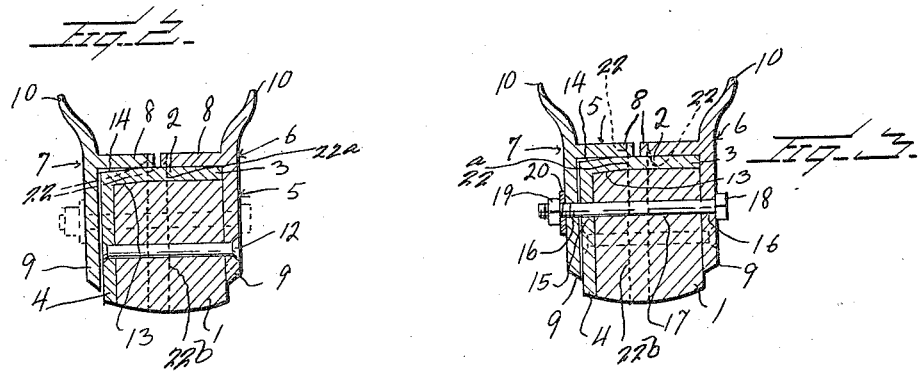
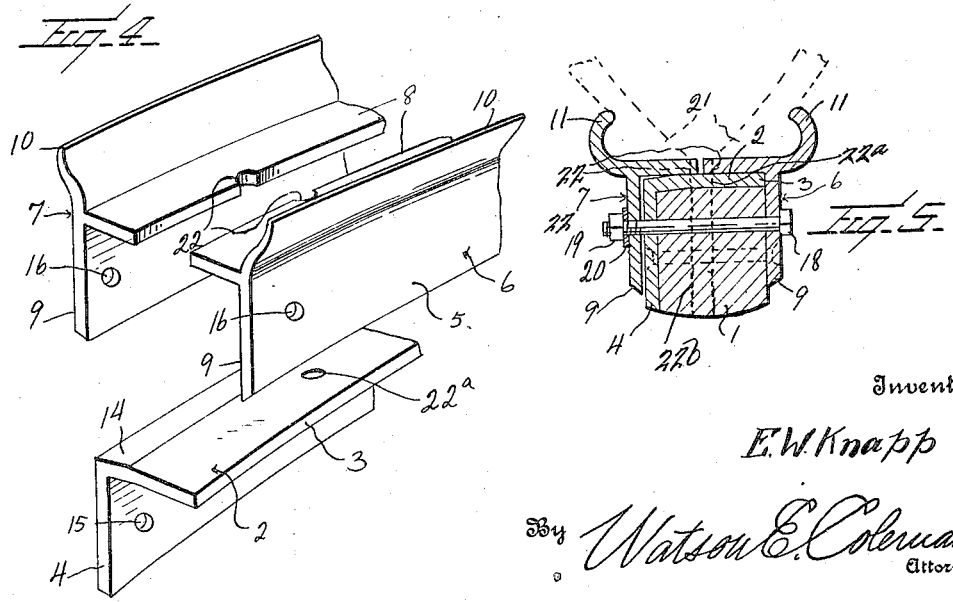
Inventor
E. W. Knapp
By Watson E. Coleman
Attorney

UNITED STATES PATENT OFFICE.

EMANUEL W. KNAPP, OF NEVADA, OHIO.

TIRE-RETAINING RIM FOR AUTOMOBILE-WHEELS.

1,390,043.

Specification of Letters Patent.  Patented Sept. 6, 1921.

Application filed December 24, 1919. Serial No. 347,248.

*To all whom it may concern:*

Be it known that I, EMANUEL W. KNAPP, a citizen of the United States, residing at Nevada, in the county of Wyandot and State of Ohio, have invented certain new and useful Improvements in Tire-Retaining Rims for Automobile-Wheels, of which the following is a specification, reference being had to the accompanying drawings.

This invention relates to an improved tire retaining rim or rim construction for automobile wheels, and an object of the invention is to provide a device of this kind, which is very simple, efficient and durable in construction and comprises but very few parts, and furthermore is capable of being manufactured very cheaply and sold at a reasonable profit.

Another object of the invention is the provision of a rim construction, wherein a repairer has to contend with but a single piece after the application of the rim construction to the felly, to permit the removal and the application of a tire.

Another object of the invention embodies the fact that when the single piece is removed, the tire is free to be detached, repaired or replaced, or a new tire substituted.

A still further object of the invention is the provision of an improved rim construction of this character consisting of three parts and means for permanently attaching two of the parts to the felly, in combination with means for rigidly but detachably fastening the third part in a position overlying one of the two parts, and since the latter fastening means passes through all three parts, the rim construction is securely fastened to the felly, to hold the tire firmly in position.

An additional object of the invention is to provide a rim construction of such a design that but a single tool such as a monkey wrench or the like is needed to detach or remove one of the parts of the rim, to permit the removal of the tire, thereby characterizing the device as means whereby the tire is rendered demountable very quickly.

The invention further aims to provide a rim construction requiring no retaining lugs, milled or fancy fittings or forgings and yet at the same time provide a rim construction including very simple efficient means for securing the rim construction to the felly, and in such wise as to prevent the parts from slipping, sliding or crawling relatively to the felly, and furthermore to so construct the parts as to prevent them from getting out of order, and should the securing means of the parts, such as bolts or the like be defective, the rim construction would not be endangered in any way.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in side elevation of a portion of an automobile wheel, showing the improved rim construction as applied.

Fig. 2 is a cross sectional view on the line 2—2 of Fig. 1, showing the means for fastening all three parts of the rim construction to the felly, in fact showing the means for fastening two of the parts permanently and the means for fastening one of the parts detachably in dotted lines.

Fig. 3 is a cross sectional view on line 3—3 of Fig. 1 showing the means for fastening one of the parts detachably in full lines and the means for fastening two of the parts permanently to the felly in dotted lines.

Fig. 4 discloses collective view of the three parts of the rim construction.

Fig. 5 is a cross sectional view showing a modified form of connections between the tire and the tire retaining sections.

Referring more especially to the drawings, 1 designates the felly of the wheel and 2 denotes a felly band, which is angular in cross section, therefore comprises an endless felly band portion 3 (which fits the outer cylindrical surface of the felly) and a radial annular flange 4, which engages the outer side face of the felly. This felly band 2 constitutes a bearing and supporting means for the tire retaining rim 5. The tire retaining rim comprises two sections 6 and 7, each of which is angular in cross section and in endless circular form, therefore comprising a cylindrical part 8 engaging the band portion of the wheel rim, and a radial annular flange portion 9. One of the tire retaining rim sections has its radial annular flange engaging the inner side face of the felly, while the radial annular flange 9 of the other tire retaining rim section engages the outer side face of the radial annular flange 4 of the felly band.

It is to be noted that the sections of the tire retaining rim may have tire engaging retaining flanges 10, such as shown in Figs. 1 to 4 inclusive or may be provided with tire retaining clencher flanges 11 as shown in Fig. 5. In other words, the sections of the tire retaining rim may have any suitable tire retaining flanges, even different from those now illustrated, without in any way affecting the construction and design of the tire retaining rim construction, namely, in so far as the manner of attaching the rim construction to the felly.

Furthermore, the rim section 6, and the felly band 2 are permanently and securely attached to the felly, preferably by means of transversely disposed rivets 12, though not necessarily, for it is obvious that other suitable means may be employed. The heads of the rivets 12 are counter-sunk in the flanges 4 and 9 of the rim section and the felly-band respectively, in order to provide a neat appearing mechanical construction.

A part of the felly 1 adjacent its outer cylindrical surface is cut away or beveled as shown at 13 and the felly band particularly the band portion, is correspondingly constructed so as to fit and engage the cut away or beveled portion 13. Also the outer cylindrical face of the band portion 3 of the felly band 2, particularly adjacent and conforming to the contour of the inner part of the band is likewise beveled or cut away, as shown at 14. If desired, however, the beveled or cut away portion 13 may be eliminated, but it is the aim to retain the beveled or cut away portion 14 of the band portion 3 of the felly band. By means of the beveled or cut away portion 14 it is obvious that the rim section 7 is capable of being easily fitted upon the band portion 3 of the felly band. In other words, this rim section 7 may be easily slipped into position, particularly since the inner cylindrical surface of the cylindrical portion 8 of the tire retaining rim section remains truly cylindrical throughout.

The radial flanges 4 and 9 of the felly band and the tire retaining rim and the felly are provided with registering openings 15, 16 and 17 which are arranged at intervals between the rivets 12. Passing through these registering openings 15, 16 and 17 are removable securing bolts 18, upon the ends of which suitable holding nuts and washers 19 and 20 are applied. The nuts 19 are threaded to the bolts thereby holding the bolts securely in position. It is obvious that the felly and the tire retaining rim section 6 depend upon the rivets 12 to hold them in place particularly when the tire retaining rim section 7 is removed. However, when the bolts 18 are applied as previously set forth and shown, said felly band and the tire retaining rim section 6 are additionally secured in position, and in such wise as to withstand the various strains. The bolts 18 in addition to holding the wheel rim and tire retaining rim section more securely in place, also act to hold the tire retaining rim section 7 detachably in place. For instance, by removing the nuts 19 and the washers 20, by means of a single tool, preferably a wrench, though not necessarily, the tire retaining rim section may be easily and very quickly removed, so that the tire is free to be removed, without the use of any other tool whatsoever. In fact, when the tire retaining rim section 7 is removed, sufficient room is left under the tire, between the tire and the band portion of the felly band so as to permit the repairer or tire remover to use the hands engaging between the band and the tire to easily pull it off and out of engagement with the tire retaining rim section 6.

The flanges 10 and 11 or any other tire engaging flanges are designed to so engage the tire as to hold the same in position. The flange 10 simply engages the opposite sides of the tire, to hold it against lateral movement with relation to the tire retaining rim. However, the flanges 10 are designed to simply engage the opposite side faces of one form of tire while the flanges 11 (which are of the clencher type) are designed to engage the usual clencher flanges 21 of a conventional form of tire. The tire retaining rim, particularly the cylindrical parts 8 thereof are provided with semi-circular recesses 22 to permit of the reception of the inflating valve stem (not shown) of the inner tube. The band portion 3 of the felly band 2 is provided with an aperture or opening 22$^a$, which registers with the opening 22$^b$ of the felly, thereby permitting of the reception of the inflating valve stem, (not shown).

From the foregoing, it will be noted that a tire retaining rim construction having no lugs, milled or fancy fittings or forgings, which will not corrode, is provided for holding the foregoing parts in place.

Furthermore, the tire retaining rim sections 6 and 7 may be constructed of any suitable metal, preferably T-shaped in cross section, though not necessarily. However, when constructing said retaining rim sections, it is the aim to utilize or shape one of the flanges of the T-shaped metal so as to provide the tire retaining flanges 10 or the clencher flanges 11, whereas the cylindrical parts 8 and the radial flanges 9 of the said tire retaining rim sections may be formed from the other flanges or parts of the T-shaped metal material. Also the felly band 2 may be constructed of any suitable material preferably angle bar material, adapted to engage the outer cylindrical and outer side faces of the felly, thereby not only forming a bearing for the tire retaining rim sections, but also reinforcing or strengthening the felly. The tire retaining rim section 7 is capable of being shifted into and out of position. Furthermore, means formed on the cylindrical parts 8 of the tire retaining rim sections for the reception of the inflating valve stem may coact with the inflating valve stem to prevent creeping of the tire retaining rim sections. Also no lugs or other retaining means are designed to be employed with connection with the tire retaining rim sections for holding the parts in position, simply because such means for retaining the parts in position are very liable to corrode and consequently stick. Furthermore, it will be noted that the retaining rim construction is very simple, simply because it consists of very few parts, namely three in number, though not necessarily, exclusive of holding bolts, to form the retaining rim section. In fact, even though the retaining bolts may be defective, or two or more depended upon for holding the tire retaining rim sections in place, the tire will remain securely in position and so will the rim construction. Furthermore, it will be observed that the rim construction for the tire simply employs two rim sections permanently attached to the felly.

The invention having been set forth, what is claimed as new and useful is:—

1. The combination with a felly having its cylindrical surface adjacent its outer side provided with a relatively gradual bevel, of an endless felly band angular in cross section, therefor, comprising a felly band portion overlying and engaging and conforming to the relatively gradual bevel and the cylindrical portion of the felly, and a radial flange engaging the outer side face of the felly, the outer cylindrical surface of the felly band portion having a relatively gradual sloping bevel substantially corresponding to the bevel of the felly and sloping toward the radial flange of said felly band, a tire retaining rim, comprising a pair of rim sections, each angular in cross section and comprising a cylindrical part and a radial flange part, the radial flange part of one tire rim section engaging the inner side of the felly, the cylindrical part overlying the felly band portion of the angular felly band, means passing through the felly and engaging the radial flange of the angular felly band, and the radial flange of the tire rim section which is adjacent the inner side of the felly, thereby permanently securing said latter tire rim section and the angular felly band on the felly, the radial flange of the other tire rim section engaging the outer face of the radial flange of the felly band, while its cylindrical part overlies relatively gradual sloping bevel of the band portion of the felly band, said gradual sloping bevel of the band portion constituting means facilitating the engagement of the cylindrical part of the last mentioned tire rim section with the band portion of the felly band, and means detachably engaging through the felly and the radial flange of the felly band and the radial flanges of the tire rim sections, to bind said parts together.

2. The combination with a felly, of an endless felly band and an endless rim section permanently engaging and overlying the substantially complete side and cylindrical faces of the felly, rivets passing through the felly and through the radial flanges of the band and the rim section for securing the parts together, an outer endless rim section engaging the radial flange of the felly band and its cylindrical portion, means independently of the rivets for detachably securing the last named rim section in position, the cylindrical part of the felly band having a gradual laterally sloping portion extending outwardly to facilitate the fitting engagement of the cylindrical part of the last named rim section on the cylindrical part of the felly band.

In testimony whereof I hereunto affix my signature.

E. W. KNAPP.